(12) United States Patent
Simnacher

(10) Patent No.: US 8,596,977 B1
(45) Date of Patent: *Dec. 3, 2013

(54) WIND GENERATOR APPARATUS HAVING COORDINATED BLADES

(76) Inventor: Larry W. Simnacher, Bay City, TX (US)

( * ) Notice: Subject to any disclaimer, the term of this patent is extended or adjusted under 35 U.S.C. 154(b) by 753 days.

This patent is subject to a terminal disclaimer.

(21) Appl. No.: 12/845,161

(22) Filed: Jul. 28, 2010

Related U.S. Application Data

(63) Continuation-in-part of application No. 11/617,581, filed on Dec. 28, 2006, now Pat. No. 7,918,648.

(51) Int. Cl.
   *F03D 3/06* (2006.01)
(52) U.S. Cl.
   USPC ......... 416/111; 146/119; 146/146 R; 415/125
(58) Field of Classification Search
   USPC .................. 416/111, 119, 131, 132 B, 146 R; 290/44, 55
   See application file for complete search history.

(56) References Cited

U.S. PATENT DOCUMENTS

| | | | |
|---|---|---|---|
| 591,775 A | 10/1887 | Peterson | |
| 4,315,713 A * | 2/1982 | Verplanke | 415/125 |
| 4,486,143 A | 12/1984 | McVey | |
| 4,551,631 A | 11/1985 | Trigilio | |
| 4,678,394 A | 7/1987 | Willoughby | |
| 4,679,985 A | 7/1987 | Worms | |
| 5,126,584 A | 6/1992 | Ouellet | |
| 6,942,454 B2 | 9/2005 | Ohlmann | |
| 7,365,448 B2 | 4/2008 | Stephens | |

* cited by examiner

*Primary Examiner* — Ninh H Nguyen
(74) *Attorney, Agent, or Firm* — Egbert Law Offices, PLLC

(57) ABSTRACT

A wind energy generator has a frame, an axle extending horizontally and being rotatably mounted relative to the frame, a plurality of arms extending radially outwardly of the axle, and a plurality of panels respectively hingedly connected to the plurality of arms at a location distal of the axle. Each of the plurality of panels extends so as to have an edge opposite the hinged connection proximal the axle. A plurality of rollers are respectively affixed adjacent the edge of the plurality of panels. A line is received by the plurality of rollers so as to extend around the plurality of rollers to cause the plurality of rollers to relative to each other as the axle rotates.

19 Claims, 3 Drawing Sheets

WIND GENERATOR APPARATUS HAVING COORDINATED BLADES

CROSS-REFERENCE TO RELATED APPLICATIONS

The present application is a continuation-in-part of U.S. application Ser. No. 11/617,581, filed on Dec. 28, 2006, and entitled "Wind Power Generator Apparatus", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to apparatus and systems for the generation of electricity by the action of wind. More particularly, the present invention the relates to wind power generators having a generally horizontal axle or shaft. More particularly, the present invention relates to wind power generators having wind-receiving panels or vanes which move in coordinated fashion so as to maximize power output while minimizing drag.

2. Description of Related Art Including Information Disclosed Under 37 CFR 1.97 and 37 CFR 1.98.

Wind energy generation is becoming increasingly popular as a means for producing energy. The production of energy from the motion of wind is a safe, clean and efficient power source. As the blades of the wind power generator rotate, they correspondingly rotate the shaft of a turbine so as to produce energy. This energy can be delivered for personal or commercial use. Large wind energy farms are now being built wherein a great deal of wind energy can be obtained and relatively windy areas of the country.

One of the problems associated with the prior art wind energy generators is the action of the drag of the wind on the action of the blade. For example, when one of the blades of a wind energy generator is capturing wind, another of the blades creates drag which inhibits the free rotation of the blades. As such, it is extremely desirable to minimize the drag on the blade during rotation of the blades by the action of wind.

In the past, wind energy generators have not utilized the action of gravity so as to effect the minimization of drag on the blades. Since virtually all wind energy generators have the blades mounted to a horizontal shaft and in which all of the blades face the wind. It is virtually impossible to minimize the action of drag without a rotation of the blades during the rotation of the shaft. In other words, when the full face of the blade faces the wind, drag will be inherent. However, if it were possible to rotate the blade so that the thin edge of one of the blades faces the wind while another of the blades captures the wind, then drag can be minimized. Unfortunately, such systems for the simultaneous rotation of the individual blades during the rotation of the shaft are exceedingly complex and expensive. As such, it is desirable to minimize the drag-producing profile of the individual blades during the rotation of the shaft so as to, accordingly, minimize the drag.

Generally, compact wind energy systems are not available. Under certain circumstances, it is not necessary to have a very large wind energy generator in order to capture the desired amount of wind energy and to produce a desired amount of power. Conventionally, wind energy generators are installed in a fixed location. If it is desired to have the blades of the wind energy generator face the direction of on-coming wind, then complex rotation mechanisms are installed so that the blades can be directed to face the direction of wind. These wind energy generators, in the past, have not been easily portable and deployable.

In the past, various patents have issued relating to wind energy generators which can adjust the orientation of the individual shutter during the rotation of the shaft of the generator. For example, U.S. Pat. No. 5,126,584 describes a wind energy generator that is configured so as to rotate about a vertical shaft. Each vane of the wind energy generator is formed of an outer stationary shutter and a movable inner shutter. The movable inner shutter is capable of pivoting about its longitudinal axis. A control mechanism is provided so as to adjust the angular orientation of the movable shaft.

U.S. Pat. No. 4,551,631 teaches an wind energy plant that is positioned on a vertical axis. A plurality of shutter assemblies are disposed in a circular orientation around each turbine associated and are independently operable for causing wind current to be directed thereby for rotating the turbine assemblies. Five wall elements extend outwardly tangential to the periphery defined by the shutter assemblies and intercept the wind current and direct the wind currents toward the shutter assemblies. A control system for the manipulation of shutter relative to the wind conditions is also described.

U.S. Pat. No. 591,775, issued on Oct. 12, 1887, is an early patent describing the use of shutter assemblies for a windmill. The shutter assemblies are arranged about a vertical axis of rotation. A mechanism is provided to control the orientation of the blade such that as the windmill rotates, the flat sides of the shutters will be presented to receive the full force of the wind. As they move rearwardly and forwardly, the shutters will gradually turn to present their edges to the wind so as to avoid any reduction in the rotation speed of the windmill. As the blades pass across the rear portions of the windmill into the direction of the wind, the blades will be turned at different angles so as to receive the wind and to assist in the rotation of the windmill.

U.S. Pat. Nos. 4,486,143 and 6,942,454 each describe deflector panels which serve to control the volume of air which bypasses each panel so as to avoid turbulence adjacent the driving vanes of the turbine.

U.S. Pat. No. 7,365,448, issued on Apr. 29, 2008 to T. G. Stephens, shows a wind-driven power generator that includes a rotor disposed in a cylindrical duct and supported by a frame for rotation in response to wind flowing through the duct. The rotor includes a plurality of circumferentially-spaced parallel rotor blades supported for rotation about a generally horizontal axis. Each blade is supported for pivotal movement to change blade pitch, angle of attack or camber as the rotor rotates. A pitch or camber control motor or self-governing wind vane mechanism is operable to move a circular cam to vary blade pitch or camber to control rotor speed. The duct is mounted on a mast having a base supported on a foundation for pivotal movement to face the wind for maximizing air flow through the duct.

U.S. Pat. No. 4,678,394, issued on Jul. 7, 1987 to F. E. Willoughby, describes a self-governing energy panel that is used as a group of panels designed to collect wind force. The panel is hung on bearings that are on support beams that protrude out from the horizontal shaft of the machine. The panel has the majority of its length below the bearings. The panel will hang vertically relative to the ground in calm periods but with increasing wind speed, the panel can change to a completely horizontal position by rotating on the bearings. The force of the wind will cause the panel to carry the support beam in a forward direction and turn the main horizontal shaft of the machine so as to turn a generator.

U.S. Pat. No. 4,679,985, issued on Jul. 14, 1987 to L. Worms, shows an energy converter that has a frame, a rotor mounted in the frame with a rotor shaft and vanes, and an element that can connect the rotor shaft to a generator, an alternator or another energy-converting mechanism. Each vane has a holder, a plurality of blades which hinge in the holder about small axes which lie in parallel relationship with the rotor shaft, and stops for the blades. The blades are a plurality of leaves which hinge on one another about axes which lie in parallel relationship with the rotor shaft. Stops limit the relative hinging motion of the leaves, on the one hand, to the position where they lie in extension of one another, and, on the other hand, to a position where the leaves form angles, for example in the range of 135 degrees.

It is an object of the present invention to a wind energy generator which produces electrical energy by the action of wind.

It is another object of the present invention to provide a wind energy generator which minimizes the drag affecting the rotation of the blades.

It is another object of the present invention to provide a wind energy generator in which the orientation of the panels or vanes of the wind energy generator move in a coordinated fashion.

It is still another object of the present invention to provide a wind energy generator that can include supplemental electricity generation as a result of rotation of the panels or vanes.

It is another object of the present invention to provide a wind energy generator which is portable and/or capable of being mounted upon a vehicle.

It is still a further object of the present invention to provide a wind energy generator which is reliable, cost-effective and energy efficient.

These and other objects and advantages of the present invention will become apparent from a reading of the attached specification and appended claims.

BRIEF SUMMARY OF THE INVENTION

The present invention is a wind energy generator that comprises a frame, an axle extending horizontally and being rotatably mounted relative to the frame, a plurality of arms extending radially outwardly of the axle, and a plurality of panels respectively hingedly connected to the plurality of arms at a location distal of the axle. Each of the plurality of panels extends so as to have an edge opposite the hinged connection proximal the axle.

In the present invention, a plurality of rollers are respectively affixed adjacent the edge of the plurality of panels. A line is received by the plurality of rollers. This line defines a continuous loop. In the preferred embodiment of the present invention, each of the plurality of rollers is a sheave. The line is in the nature of a chain. The line extends around the plurality of rollers so as to cause the plurality of panels to move relative to each other as the axle rotates. The axle extends interior of the continuous loop.

The edge of the plurality of panels is curved outwardly of a remainder of the panel. As such, this plurality of panels serves to direct the air in a proper direction for the purposes of generating power and minimizing drag.

The plurality of arms includes a first pair of arms extending radially outwardly of the axle in generally parallel relation to each other, a second pair of arms extending radially outwardly of the axle in generally parallel relation to each other, and a third pair of arms extending radially outwardly of the axle in generally parallel relation to each other. The plurality of panels includes a first panel hingedly connected to the first pair of arms, a second panel hingedly connected to the second pair of arms, and a third panel hingedly connected to the third pair of arms. The first pair of arms and the second pair of arms and the third pair of arms are equally radially spaced from each other.

The frame of the present invention can be mounted to a vehicle. The vehicle can be used so as to transport the wind energy generator to a desired location and to orient the wind energy generator in a direction facing the wind.

In an embodiment of the present invention, at least one of the plurality of panels has an electrical generator affixed to a surface thereof. This electrical generator includes a housing, a coil positioned in the housing so as to define a longitudinal pathway through an interior of the coil, and a magnet slidably received in the longitudinal pathway so as to be moveable through the coil as the axle rotates. As such, as the panels pivot upwardly and downwardly, the magnet will slide through the coil so as to produce electrical energy in accordance with Faraday's law.

DETAILED DESCRIPTION OF THE INVENTION

Figure 1:
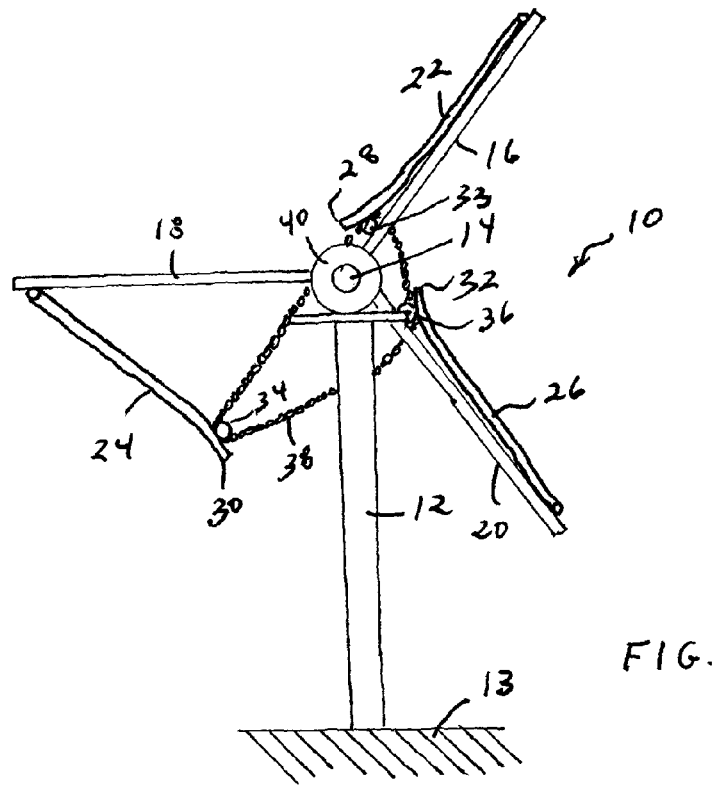
FIG. 1 is a side elevational view of the wind energy generator in accordance with the preferred embodiment of the present invention.

Referring to FIG. 1, there is shown the wind energy generator 10 in accordance with the preferred embodiment of the present invention. The wind energy generator 10 has a frame 12 that extends upwardly from an underlying surface 13. An axle 14 extends horizontally and is rotatably mounted to the frame 12. A plurality of arms 16, 18 and 20 extend radially outwardly of the axle 14. A plurality of panels 22, 24 and 26 are respectively hingedly connected to arms 16, 18 and 20. Each of the panels 22, 24 and 26 are hingedly connected to the arms 16, 18 and 20 at a location distal to the axle 14. Each of the panels 22, 24 and 26 has respective edges 28, 30 and 32 positioned proximal to the axle 14.

The panel 22 has a roller 33 mounted to a surface of the panel 22 adjacent to the edge 28. The panel 24 has a roller 34 mounted adjacent to the edge 30. The panel 26 has a roller 36 affixed to a surface thereof adjacent to the edge 32. A line 38 is received by the rollers 33, 34 and 36 so as to form a continuous loop. The axle 14 is illustrated as extending through an interior of the continuous loop of the line 34.

As used herein, the term "roller" can refer to a variety of structures. The roller can be a sheave, a pulley, a sprocket, or similar mechanism that allows the line 38 to extend therearound and therethrough. The term "line" as used herein can refer to a variety of structures. The line 38 can be a chain (as illustrated in FIG. 1), a cord, a belt, a cable, or similar structures.

In FIG. 1, it can be seen that the line 38 serves to assure proper coordinated movement of the panels 22, 24 and 26 during the rotation of the axle 14. In FIG. 1, as the wind is moving from left to right, the wind will impact upon an outer surface of the panel 22. This will cause the arm 16 to rotate in a clockwise direction. The drag force of the wind is deflected by the surface of the panel 24. The panel 26 is positioned in a generally vertical orientation. The wind is prevented from having drag forces affecting panel 26 by the blocking effect caused by the angular orientation of the panel 24.

As the panel 24 moves upwardly during the rotation of the axle 14, the panel 24 will assume a generally vertical orientation so as to receive the full force of the wind thereagainst. The movement of the panel 24 into this orientation will cause, through the use of line 34, the other panels to deflect. Since the line 34 is of a fixed circumference, the panels 22, 24 and 26 will have coordinated movement assured during each rotation of the axle 14. Additionally, gravity will tend to urge each of the panels 22, 24 and 26 downwardly. This gravity-driven force will cause the rollers 33, 34 and 36 to exert a force upon the line 38 in order to cause the panels 22, 24 and 26 to assume their desired drag-minimizing orientation. As such, the wind energy generator 10 of the present invention can produce energy in a very efficient manner with a minimum of drag. The orientation of the panels 22, 24 and 26 will be assured regardless of the amount of wind that is imparted upon the panels 22, 24 and 26.

In FIG. 1, it can be seen that the frame 12 includes a vertical member that supports bearings 40 at an upper end thereof. The frame 12 is illustrated as fixedly mounted in an underlying surface 13, such as the earth. The axle 14 is received within the bearings 40 in a relatively low-friction manner.

Figure 2:
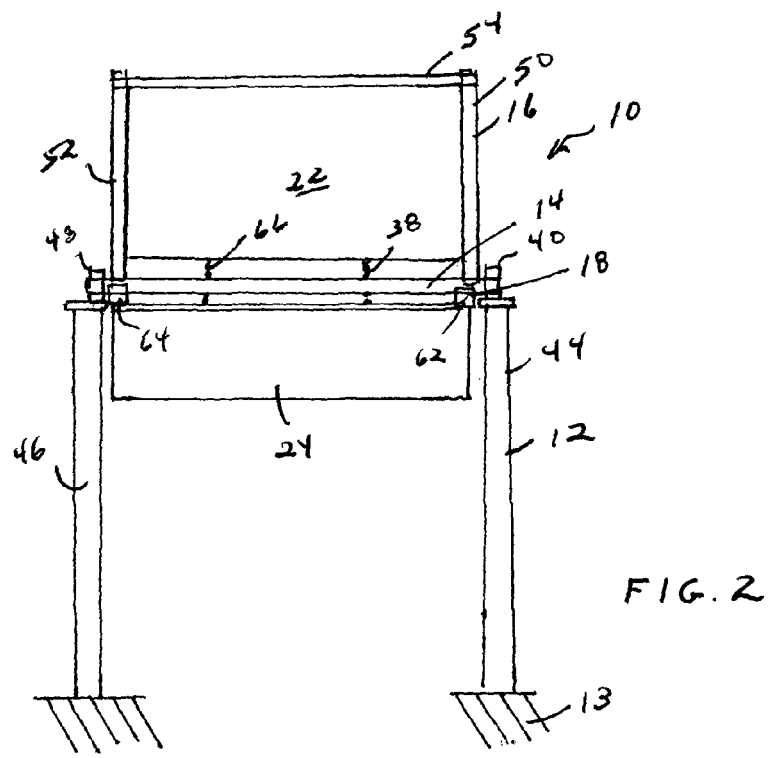
FIG. 2 is a frontal view showing the wind energy generator in accordance with the preferred embodiment of the present invention.

FIG. 2 shows a frontal view of the wind energy generator 10 in accordance with the present invention. In FIG. 2, it can be seen that the frame 12 includes a first vertical member 44 and a second vertical member 46. Each of the vertical members 44 and 46 are fixedly mounted onto the underlying surface 13. Bearings 40 and 48 receive opposite ends of the axle 14 therein. The first arm 16 includes a first pair of arms 50 and 52. Arms 50 and 52 extend outwardly of the axle 14 in generally parallel relationship to each other. A hinge 54 is mounted adjacent to the end of the arms 50 and 52 opposite the axle 14. Hinge 54 will allow the panel 22 to pivot relative to the arms 50 and 52 during the rotation of the axle 14. The second arm 18 includes an arm 62 and an arm 64. The panel 24 is affixed to the arms 62 and 64. The line 38 can include a first line 38 and a second line 66. Lines 38 and 66 extend in generally parallel relationship to each other on opposite sides of the center line of the panels 22 and 24.

In FIG. 2, it can be seen that the panel 22 receives the full force of the wind thereagainst. The panel 24 deflects the oncoming wind downwardly. The panel 26 will be generally obscured by the orientation of the panel 24. As such, any adverse drag caused by the panel 26 is effectively avoided.

It should be noted that within the wind energy generator 10, as illustrated in FIGS. 1 and 2, suitable turbines can be connected to the axle 14 in a conventional manner. These turbines are well known in the art and can be easily integrated in association with the axle 14.

Figure 3:
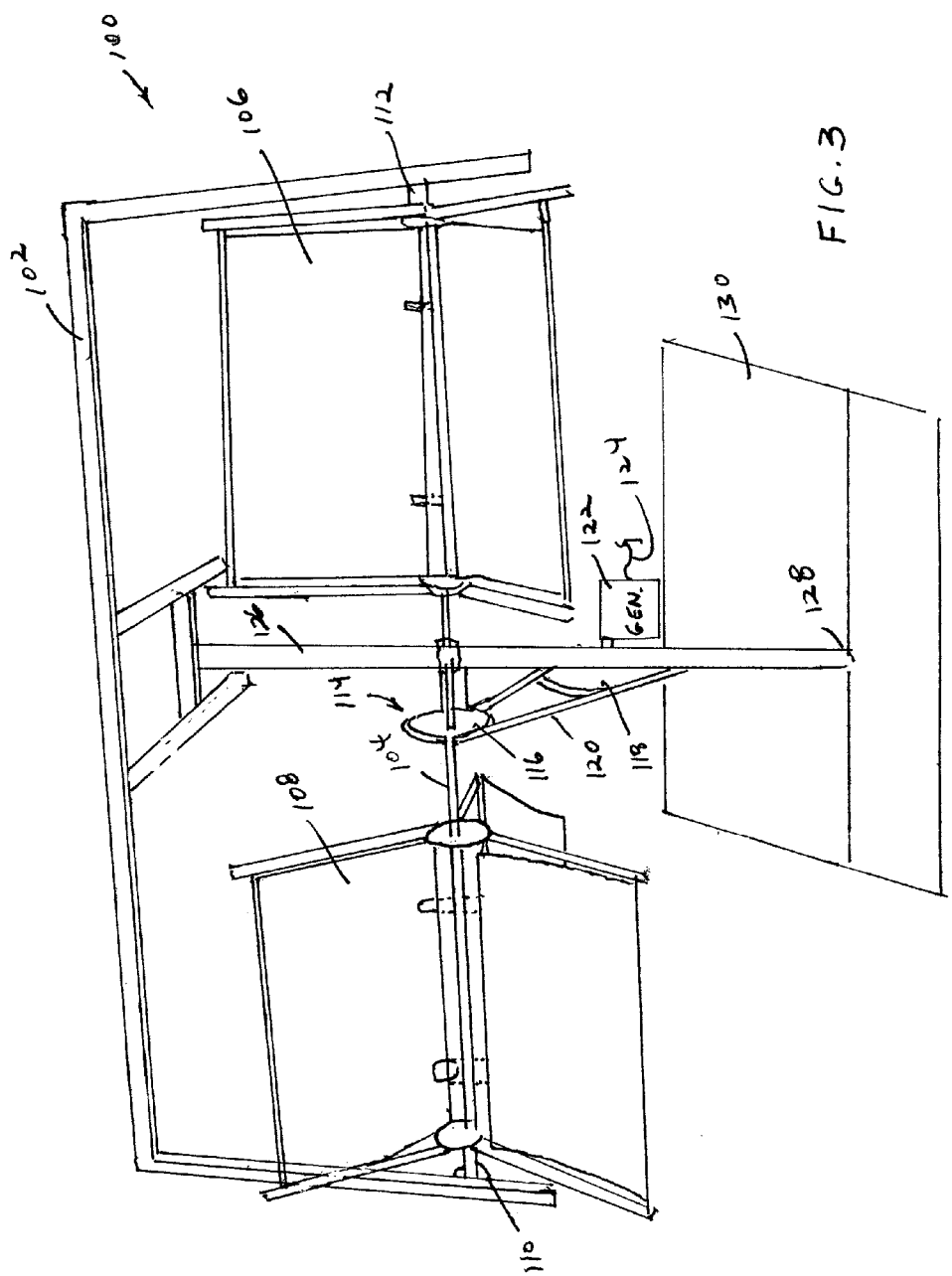
FIG. 3 is a perspective view showing an arrangement of wind energy generators as deployed upon a truck bed.

FIG. 3 shows an assembly 100 employing the wind energy generators of the present invention. As can be seen, the assembly 100 includes a frame 102 having an axle 104 extending thereacross. A first wind energy generator 106 is connected to the axle 104 in the manner described hereinpreviously. Similarly, a second wind energy generator 108 is affixed to the axle 104 in the manner described hereinbefore. The axle 104 is received by suitable bearings 110 and 112 located at opposite ends of the frame 102.

In FIG. 3, there a transmission system 114 that is affixed to the axle 104. The transmission system 114 includes a first wheel 116 and a second wheel 118 that are connected by a belt 120. As such, as the axle 104 rotates, the wheel 116 is suitably driven, along with the belt 120, so as to rotate the wheel 118. Wheel 118 has an axle connected to a shaft of a generator 122. Generator 122 has a line 124 extending outwardly therefrom so that electrical energy can be passed outwardly of the assembly 100.

In FIG. 3, the frame 102 includes a vertical member 126 extending downwardly. The bottom 128 of the vertical member 126 is illustrated as mounted in the bed 130 of truck. Suitable connection systems can be employed with the bed 130 so as to properly receive the vertical member 126. The vertical member 126 can be rotatably mounted within the bed 130 so as to allow the user of the wind generator assembly 100 to properly direct the frame 102 so that the wind energy generators 106 and 108 face the full force of the wind. Alternatively, the rotation mechanism will allow the wind energy generators 106 and 108 to properly "vane" so as to receive the full force of the wind.

Each of the wind energy generators 106 and 108 has configuration similar to that illustrated in FIGS. 1 and 2. The dual mounting of the wind energy generators 106 and 108 within frame 102 can enhance the amount of power generated by the wind generator assembly 100.

It is important to note that by affixing the wind generator assembly 100 to the bed 130 of a truck, the wind generator assembly 100 can be transported to any desired location. The electrical generator 122 can be connected by line 124 to a battery or other energy storage arrangement. Additionally, line 124 can be connected to the electrical main for the purpose of receiving the electricity from the assembly 100. As a result of this arrangement, the present invention allows the user to properly transport the assembly 100 to any desired location. The assembly 100 can be deployed as required. The assembly 100 can be a temporary installation. If the bottom 128 of the vertical member 126 is fixedly installed within the bed 130, the truck can suitably manipulated so that the wind energy generators 106 and 108 face the full force of the wind.

Figure 4:
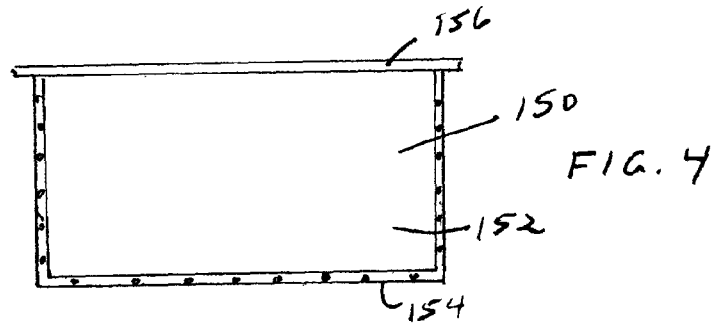
FIG. 4 is a plan view showing an individual panel as used in the wind energy generator of the present invention.

FIG. 4 is a plan view showing a single panel 150 as employed within the wind energy generator 10 of the present invention. The panel 150 includes a sheet 152 having a reinforcing border 154 extending therearound. A hinge 156 is connected to the panel 150 so as to allow the panel 150 to be properly installed on the wind energy generator 10.

Figure 5:
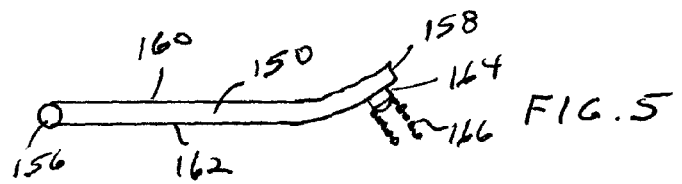
FIG. 5 is a side view showing an individual panel as used in the wind energy generator.

FIG. 5 is a side view of the panel 150. In particular, it can be seen that the outer edge 158 is curved upwardly. The panel 150 has a wind-facing surface 160 and a back surface 162. The roller 164 is mounted to the back surface 162 generally adjacent to the edge 158. The chain 166 is illustrated as extending across the surface of the roller 164. The hinge 156 is affixed to the panel 150 at an end opposite the edge 158.

Figure 6:
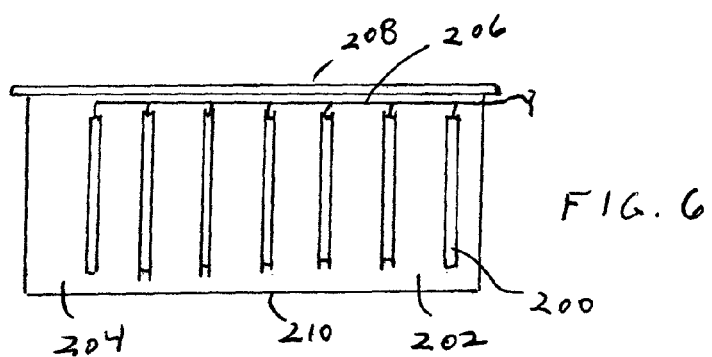
FIG. 6 is a plan view showing a panel of the wind energy generator having an electricity generator mounted to a suitable thereof.

In FIG. 6, it can be seen that the present invention facilitates the ability to include supplemental or auxiliary electricity generating devices 200 on the surface 202 of panel 204. Each of the electricity generating devices 200 are arranged in generally parallel relationship so as to extend across the width of the panel 204. Each of the electricity generating devices 200 are connected to bus line 206 so that electricity produced by the electricity generating devices 200 can be delivered to an external location. The devices 200 are generally tubular members that are affixed to at least one of the surfaces of the panel 204 between the hinge 208 and the edge 210.

Figure 7:
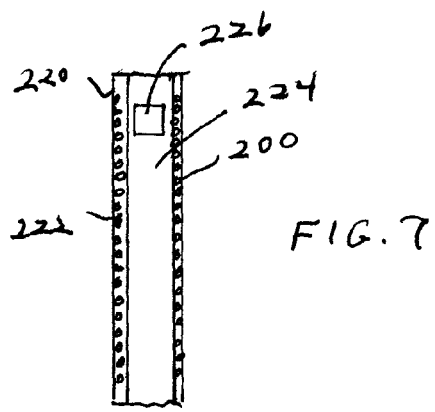
FIG. 7 is a cross-sectional view of an individual electricity generator as mounted on the surface of the panel of FIG. 6.

FIG. 7 illustrates a single electricity generating device 200. As can be seen, there is a housing 220 that has a coil 222 extending longitudinally therealong. The coil 222 defines a longitudinal pathway 224. A magnet 226 is slidably positioned within the longitudinal pathway 224. In accordance with Faraday's Law, the movement of the magnet 226 through the interior of the coil 222 will serve to produce electricity. As such, as the panel 204 moves upwardly and downwardly during the rotation of the axle 14 of the wind energy generator 10, the movement of the magnet 226 will also move through the longitudinal pathway 224 so as to produce small amounts of electricity. It has been found, that with continued use of the wind energy generator 10 of the present invention, the electricity generating device 200 can serve to supplement the power produced by the wind energy generator. The electricity generating device 200 does not affect the aerodynamic qualities of the wind energy generator and provides a supplemental source of power. The electricity generating device 200 can be affixed to one or both surfaces of each of the panels of the wind energy generator can be affixed to all of the panel, as desired.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A wind energy generator comprising:
    a frame;
    an axle extending horizontally and being rotatably mounted relative to said frame;
    a plurality of arms extending radially outwardly of said axle; and
    a plurality of panels respectively hingedly connected to said plurality of arms at a location distal of said axle, each of said plurality of panels extending so as to have an edge opposite the hinged connection proximal said axle, at least one of said plurality of panels having an electrical generator affixed to a surface thereof.

2. The wind energy generator of claim 1, further comprising:
    a plurality of rollers respectively affixed adjacent said edge of said plurality of panels; and
    a line received by said plurality of rollers.

3. The wind energy generator of claim 1, said line defining a continuous loop.

4. The wind energy generator of claim 3, said axle extending interior of said continuous loop.

5. The wind energy generator of claim 1, each of said plurality of rollers being sheave, said line being a chain.

6. The wind energy generator of claim 1, said line extending around said plurality of rollers so as to cause said plurality of panels to move relative to each other as said axle rotates.

7. The wind energy generator of claim 1, said edge of each of said plurality of panels being curved outwardly of a remainder of the panel.

8. The wind energy generator of claim 1, said plurality of arms comprising:
    a first pair of arms extending radially outwardly of said axle in generally parallel relation to each other;
    a second pair of arms extending radially outwardly of said axle in generally parallel relation to each other; and
    a third pair of arms extending radially outwardly of said axle in generally parallel relation to each other.

9. The wind energy generator of claim 8, said plurality of panels comprising:
    a first panel hingedly connected to said first pair of arms;
    a second panel hingedly connected to said second pair of arms; and
    a third panel hingedly connected to said third pair of arms.

10. The wind energy generator of claim 8, said first pair of arms and said second pair of arms and said third pair of arms being equally radially spaced from each other.

11. The wind energy generator of claim 1, further comprising:
    a vehicle having said frame affixed thereto.

12. The wind energy generator of claim 1, said electrical generator comprising:
    a housing;
    a coil positioned in said housing so as to define a longitudinal pathway through an interior of said coil; and
    a magnet slidably received in said longitudinal pathway so as to be moveable through said coil as the axle rotates.

13. A wind energy generator comprising:
    a frame;
    an axle extending horizontally and being rotatably mounted relative to said frame;
    a plurality of arms extending radially outwardly of said axle;
    a plurality of panels respectively hingedly connected to said plurality of arms;
    a plurality of rollers respectively affixed to said plurality of panels; and
    a line received by said plurality of rollers so as to cause said plurality of panels to move relative to each other as said axle rotates.

14. The wind energy generator of claim 13, said line defining a continuous loop, said axle extending through an interior of said continuous loop.

15. The wind energy generator of claim 13, said plurality of panels respectively hingedly connected to said plurality of arms at a location distal of said axle, each of said plurality of panels having an edge opposite the hinge connection proximal said axle.

16. The wind energy generator of claim 13, said plurality of arms comprising:
    a first pair of arms extending radially outwardly of said axle in generally parallel relation to each other;
    a second pair of arms extending radially outwardly of said axle in generally parallel relation to each other; and
    a third pair of arms extending radially outwardly of said axle in generally parallel relation to each other, said first pair of arms and said second pair of arms and said third pair of arms being equally radially spaced from each other.

17. A wind energy generator comprising:
    a frame;

an axle extending horizontally and being rotatably mounted relative to said frame;

a plurality of arms extending radially outwardly of said axle;

a plurality of panels respectively hingedly connected to said plurality of arms; and an electricity generating means affixed to at least one of said plurality of panels for generating electricity as the panel moves during the rotation of said axle.

18. The wind energy generator of claim 17, said electricity generating means comprising:

a housing;

a coil positioned in said housing so as to define a longitudinal pathway through an interior of said coil; and a magnet slidably received in said longitudinal pathway so as to be moveable through said coil as the axle rotates.

19. The wind energy generator of claim 17, said plurality of panels respectively hingedly connected to said plurality of arms at a location distal of said axle, each of said plurality of panels extending so as to have an edge opposite the hinged connection proximal said axle, said electricity generating means positioned on a surface of panel between the hinged connection and said edge.

\* \* \* \* \*